(12) United States Patent
Nuss

(10) Patent No.: US 11,731,543 B2
(45) Date of Patent: Aug. 22, 2023

(54) MOTOR-VEHICLE ACCESSORY

(71) Applicant: Ralph Nuss, Poppenricht (DE)

(72) Inventor: Ralph Nuss, Poppenricht (DE)

(73) Assignee: GRAMMER AG, Ursensollen (DE)

( * ) Notice: Subject to any disclaimer, the term of this patent is extended or adjusted under 35 U.S.C. 154(b) by 55 days.

(21) Appl. No.: 17/071,010

(22) Filed: Oct. 15, 2020

(65) Prior Publication Data
US 2021/0138947 A1     May 13, 2021

(30) Foreign Application Priority Data

Nov. 11, 2019  (DE) .......................... 102019130399.0

(51) Int. Cl.
*B60N 2/75* (2018.01)
*B60N 2/90* (2018.01)

(52) U.S. Cl.
CPC ............. *B60N 2/767* (2018.02); *B60N 2/943* (2018.02)

(58) Field of Classification Search
None
See application file for complete search history.

(56) References Cited

U.S. PATENT DOCUMENTS

| | | | | |
|---|---|---|---|---|
| 4,655,501 A * | 4/1987 | Ishigami | ................ | B60N 2/767 297/411.32 |
| 4,828,323 A * | 5/1989 | Brodersen | ................ | B60N 2/77 248/118 |
| 5,211,414 A * | 5/1993 | Galumbeck | ............ | A61G 5/128 188/30 |
| 5,401,044 A * | 3/1995 | Galumbeck | ............ | A61G 5/128 188/2 F |
| 5,597,209 A * | 1/1997 | Bart | ....................... | B60N 2/767 297/440.1 |
| 5,884,975 A * | 3/1999 | Su | ............................ | A47C 1/03 297/411.36 |
| 5,984,416 A * | 11/1999 | Waldo | ...................... | A47C 1/03 297/411.32 |
| 8,079,645 B2 * | 12/2011 | LaPointe | ................ | A47C 7/465 297/463.1 |
| 9,016,793 B2 * | 4/2015 | Roeglin | ................. | B60N 2/767 |

(Continued)

FOREIGN PATENT DOCUMENTS

| | | | | |
|---|---|---|---|---|
| DE | 19933429 C1 | | 1/2001 | |
| DE | 10027202 A1 * | | 11/2001 | .......... B60N 2/2213 |

(Continued)

*Primary Examiner* — David E Allred
(74) *Attorney, Agent, or Firm* — Andrew Wilford

(57) ABSTRACT

An accessory for a vehicle has a base and a pivot part that can be pivoted relative to the base in opposite first and second pivoting direction between first and second end positions. A first latch and a second latch can lock the pivoting movement of the pivot part in at least one of the directions. An actuator automatically and/or manually moves the latches between a latched position in which the first latch and the second latch engaged and a released position in which the latches disengaged. One of the latches has a rotatable wheel rotatable having first blocking surfaces. The base or the pivot part has a first teeth engaging second teeth of the wheel. The other latch is provided with second blocking surfaces that engage the first blocking surfaces in the latched position and disengage therefrom in the released position.

10 Claims, 8 Drawing Sheets

(56) References Cited

U.S. PATENT DOCUMENTS

| | | |
|---|---|---|
| 9,272,645 B2 | 3/2016 | Boehner et al. |
| 9,499,071 B2 | 11/2016 | Karthaus |
| 10,150,393 B2 | 12/2018 | Pluta et al. |
| 10,457,177 B2 | 10/2019 | Nuss et al. |
| 11,084,407 B2 | 8/2021 | Keller et al. |
| 11,198,378 B1 * | 12/2021 | Kuo .................. B64D 11/0696 |
| 11,382,784 B2 | 7/2022 | Vogel et al. |
| 11,401,038 B1 * | 8/2022 | Warwick .............. B64C 11/064 |
| 2002/0070597 A1 * | 6/2002 | Liu .......................... A47C 1/03 |
| | | 297/411.38 |
| 2002/0096928 A1 * | 7/2002 | Bidare ................... B60N 2/767 |
| | | 297/411.32 |
| 2004/0004385 A1 * | 1/2004 | Lee ......................... A47C 1/03 |
| | | 297/411.36 |
| 2005/0093349 A1 * | 5/2005 | Low ....................... B60N 2/841 |
| | | 297/216.12 |
| 2009/0218863 A1 * | 9/2009 | LaPointe .............. A47C 1/0345 |
| | | 297/284.4 |
| 2009/0218873 A1 * | 9/2009 | LaPointe ................ A47C 1/036 |
| | | 297/396 |
| 2014/0175850 A1 * | 6/2014 | Roeglin ................. B60N 2/753 |
| | | 297/463.1 |
| 2020/0377024 A1 * | 12/2020 | Neumann ................. B60R 7/04 |

FOREIGN PATENT DOCUMENTS

| | | |
|---|---|---|
| DE | 102008056290 A1 | 5/2010 |
| KR | 1020060015893 A | 2/2006 |

* cited by examiner

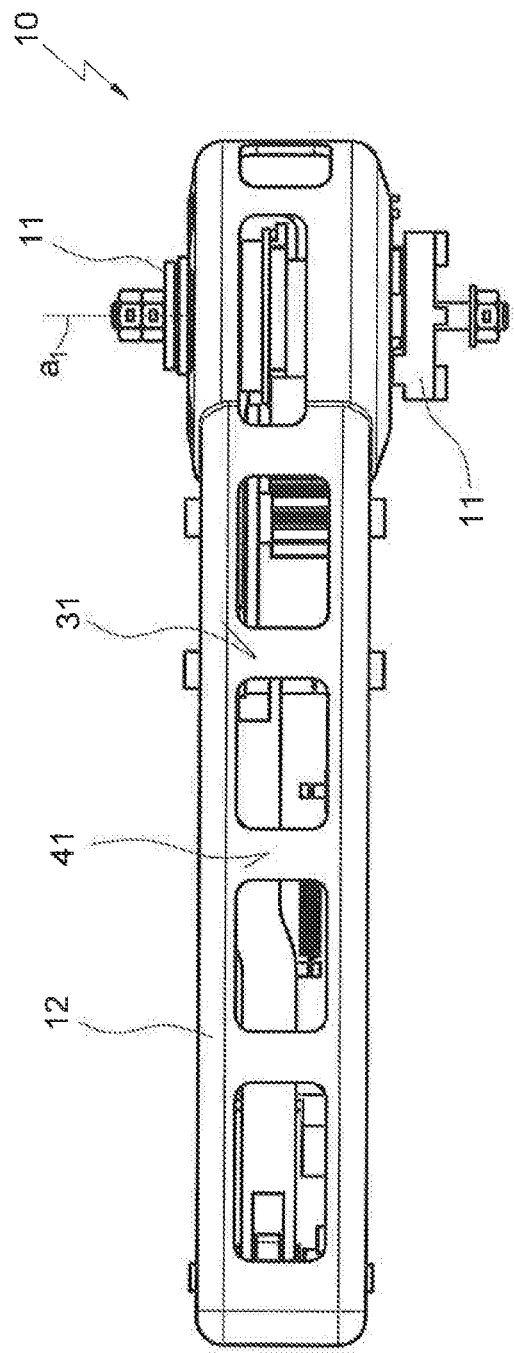
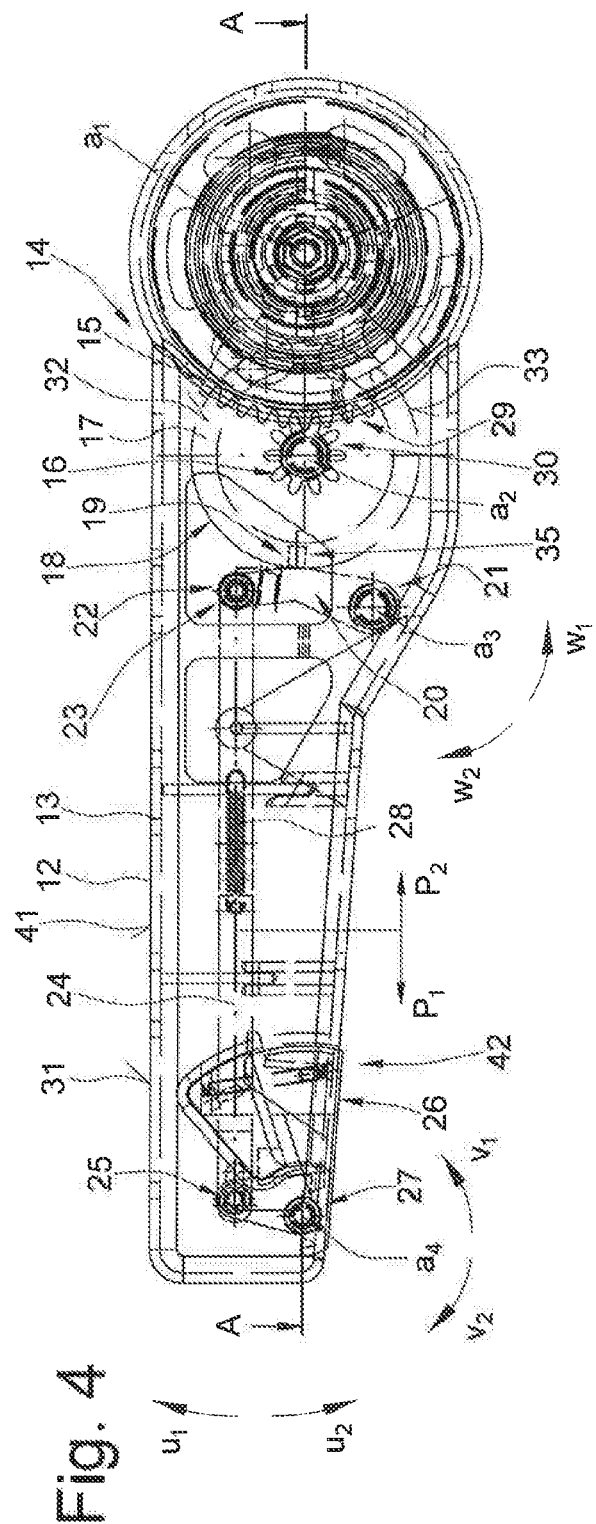

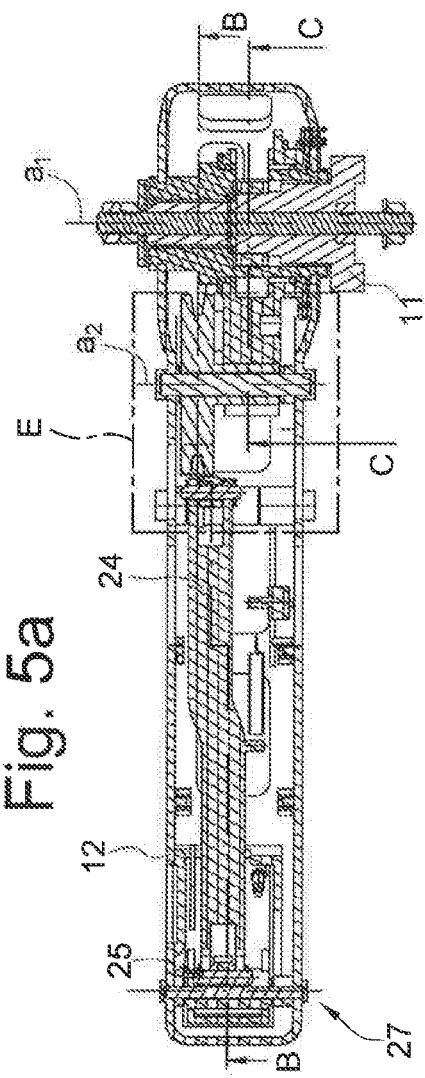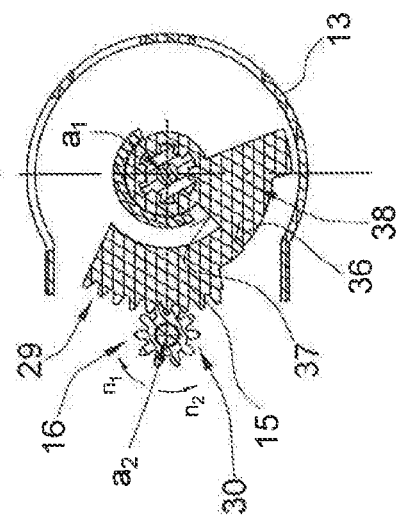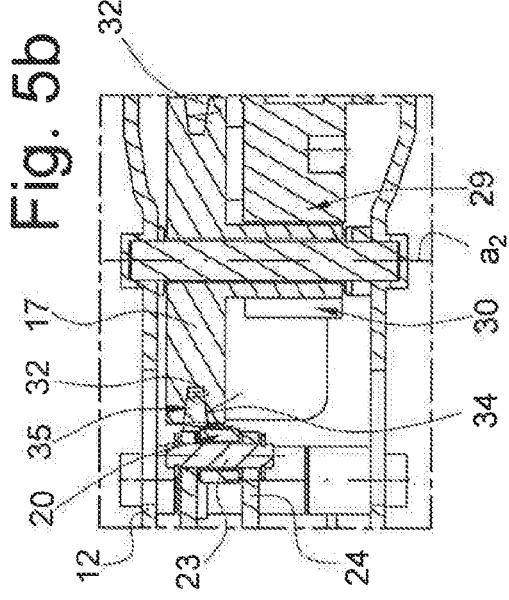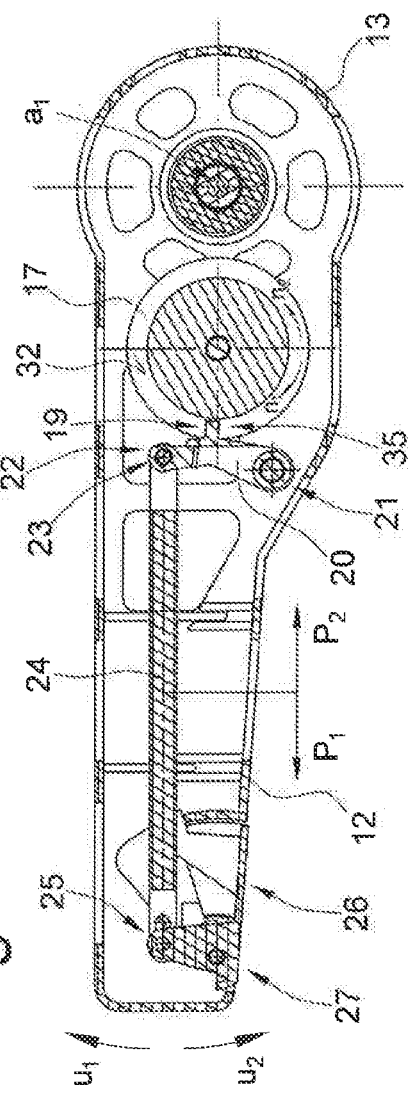

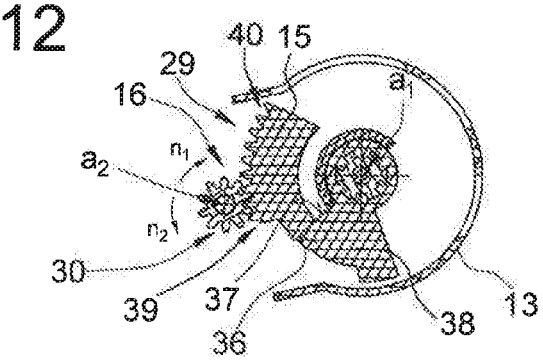
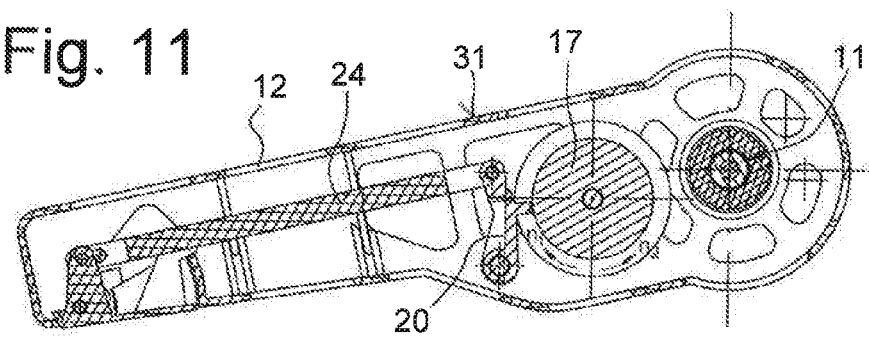
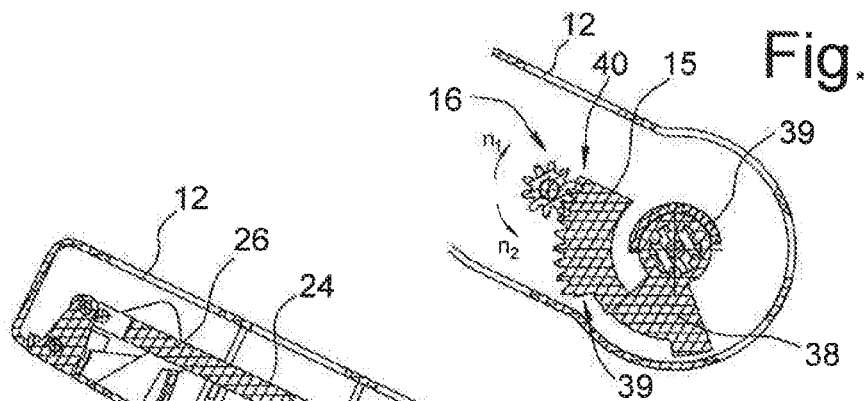
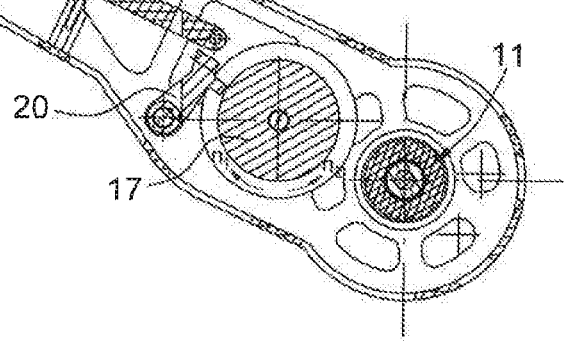

MOTOR-VEHICLE ACCESSORY

FIELD OF THE INVENTION

The invention relates to an accessory for vehicles. Within the meaning of the invention, a vehicle is a land vehicle, an aircraft or a watercraft.

BACKGROUND OF THE INVENTION

An accessory of this kind is e.g. an armrest for a vehicle seat. The armrest comprises a base and an arm support that is pivotable relative to the base. An armrest comprising an arm support that is pivotable relative to a base is known from public prior use.

The armrest is equipped with a latch assembly, comprising a first, rigidly arranged set of teeth that is on the base and a second set of teeth that is on the arm support and is formed on a movable latch element. When the sets of teeth are in engagement, the latch assembly is in the latched position and when the sets of teeth are out of engagement, the latch assembly is in the released position. Moving the latch element by an actuating device can move the first set of teeth out of engagement with the second set of teeth. In this way, it was possible to lock the inclination of the arm support in different positions, in stages predetermined by the teeth.

OBJECT OF THE INVENTION

The object of the invention is to provide an accessory comprising a pivot part that can be pivoted relative to a base, which device makes it possible to lock the pivot part in different use positions, and wherein the properties of the locking, such as manual and/or automatic adjustment between the latched position and the released position, continuous locking or locking at stages, can be modified without great design complexity.

SUMMARY OF THE INVENTION

The accessory of the invention comprises a base and a pivot part that can be pivoted relative to the base about a pivot axis in a first pivoting direction and a second pivoting direction between a first end position and a second end position. The accessory comprises a latch assembly that can be moved between a latched position and a released position for locking the pivoting movement of the pivot part in at least one direction. That is to say, in the latched position, the latch assembly can prevent the pivot part from moving in both pivoting directions or alternatively only in one pivoting direction. In the released position, it is possible for the pivot part to move in both pivoting directions, The latch assembly comprises first latch on the base and second latch on the pivot part. The term latch is not intended to imply any restrictions on structures that interact in a positive fit.

The accessory comprises an actuating device for automatically and/or manually moving the latch assembly between the latched position in which the first latch and the second latch are in engagement, and the released position in which the latch are out of engagement. Within the meaning of the invention, "released position" cannot only mean that the latch are completely out of engagement. A ratio of the latch which allows the wheel to rotate, such as a grinding ratio, is likewise conceivable in the released position.

One latch comprises at least one wheel that is rotatable about a rotational axis and has first blocking surfaces. The wheel may be arranged on the pivot part or on the base. By suitably selecting the wheel diameter, the locking forces can be influenced. The other latch comprises at least one latch element that is movable between a latched position and a released position and comprises second blocking surfaces, and may be arranged on the pivot part or on the base. When the blocking surfaces are in engagement in the latched position, the wheel is prevented from moving, at least in a rotational direction. For example, the wheel is prevented from moving in both rotational directions in the latched position, The accessory comprises a transmission device comprising a base or first coupling formation on the pivot part that are in engagement with second coupling formation of the wheel in order to cause the wheel to rotate in the event of a pivoting movement of the pivot part. The rotational movement of the wheel is e.g. proportional to the pivoting movement of the pivot part. A transmission ratio is formed between the first coupling formation and the second coupling formation, for example. In this case, it is for example possible to generate a high retaining force, which prevents the pivot part from pivoting, with relatively low braking force on the blocking surface of the wheel. The other latch comprises at least one latch element comprising second blocking surfaces that are arranged such that the second blocking surfaces are in engagement with the first blocking surfaces in the latched position and are out of engagement with the first blocking surfaces in the released position.

One group of blocking surfaces e.g. comprises at least one V-shaped concave surface structure and the other blocking surfaces comprise at least one V-shaped convex surface structure. The angles of the V-shaped surface structures are such that a wedge effect arises when the first blocking surfaces and the second blocking surfaces are in engagement. Here, "convex" can be understood in the sense of projecting, conically tapering surfaces and "concave" can be understood in the sense of a recess having conically tapering surfaces.

Alternatively, the first blocking surfaces and the second blocking surfaces are e.g. formed by interacting friction surfaces.

According to another alternative, the interacting blocking surfaces are formed by teeth on the wheel and teeth on the latch element, it being possible for the teeth on the latch element to be brought into engagement with the teeth on the wheel in a releasable manner.

For example, the first coupling formations is formed by a first set of teeth and the second coupling formations is formed by a second set of teeth. Each of the sets of teeth is e.g. formed as a gear wheel or a gear segment. By suitably selecting the teeth, any transmission ratio can be provided.

One of the sets of teeth is e.g. movable, in particular pivotable, and comprises a stop surface which is loaded against a counter surface of the base by a return device. In this way, the coupling formations are retained on the base until a counterforce that exceeds the force of the return device moves the coupling formation out of contact with the counter surface. This is e.g. the case when the pivot part is moved towards the second end position in the latched position.

A stop surface of the pivot part is in contact with a boundary surface of the base in the first end position and/or in the second end position. This means that, for example, a first stop surface is in contact with a first boundary surface of the base in the first end position and a second stop surface is in contact with a second boundary surface of the base in the second end position.

The actuating device e.g. comprises an actuator that can be actuated manually by a switch on the outside of the accessory by the user and that can move the latch assembly between the latched position and the released position. When the pivot part is formed by an arm support of an armrest, for example, the actuator may e.g. be arranged on a front end of the arm support, such that it is easily accessible for the user. The actuating device may comprise a transmission device having at least one movement transducer that can transform movement of the actuator into movement of the latch element, in order to bridge a spacing between the actuator and the latch element.

Alternatively or additionally to the manual actuator, the actuating device e.g. comprises a controller, comprising first control means on the first latch and second control means on the second latch, the controller being formed such that it moves the latch assembly between the latched position and the released position depending on the position of the pivot part.

The controller is e.g. designed such that, when the latch assembly is in the latched position, the pivot part is e.g. freely movable when moving in the first pivoting direction and is prevented from moving when moving in the second pivoting direction. A return movement is e.g. made possible in that, when the pivot part moves in the first pivoting direction beyond a first reversal point of the controller, the latch assembly is adjusted by the controller into the released position, such that the pivot part can pivot in the second pivoting direction until the pivot part passes a second reversal point. When this pivot part passes the second reversal point, the latch assembly is adjusted by the controller into the latched position and the pivot part can then only be freely moved in the first pivoting movement again. The reversal points are e.g. in the vicinity of the first use position and the second use position.

The controller may e.g. comprise a control cam and a guide pin that is in engagement with the control cam. For example, the control cam is formed on the wheel and the guide pin is movably connected to the latch element such that, due to the movement of the guide pin, the latch element can be moved into and out of engagement with the wheel.

According to an embodiment, the accessory is formed by an armrest and the pivot part is formed by a pivotable arm support.

The relevant total retaining force or the total retaining torque of the latch assembly is influenced by the following parameters:
- return force of the return device for returning the latch assembly to the latched position,
- the internal transmission ratio between the sets of teeth of the transmission device,—possible friction pairing between the blocking surfaces, —a possible wedge angle of the blocking surfaces,
- the diameter of the blocking surface,
- the position of the pivot axis of the latch element relative to the position of the blocking surfaces and to the rotational axis of the wheel.
- On the basis of how the above-mentioned parameters are set, depending on the rotational direction, this can have a force-increasing effect in a first rotational direction of the wheel and a force-reducing effect in a second rotational direction in relation to the return force of the return device on the latch assembly or can have a force-reducing effect in a first rotational direction of the wheel and a force-increasing effect in a second rotational direction in relation to the return force of the return device, or also can have a self-locking effect with any safety factor in a first rotational direction and a force-reducing effect in a second rotational direction in relation to the return force of the return device.

The resulting actuating forces and paths of the unlatching are low. Depending on the configuration, the system can also be unlatched in a loaded manner, since the above-mentioned parameters have an increasing effect in the blocking direction, but facilitate the unlatching.

Embodiments of the invention are described by way of example in the following description of the figures, also with reference to the drawings. Here, for the sake of clarity, even if different embodiments are involved, identical or comparable parts or elements have been denoted by identical reference signs, sometimes with the addition of lower-case letters.

Features that are only described in relation to one embodiment can also be provided in any other embodiment of the invention within the scope of the invention. Even if they are not shown in the drawings, such amended embodiments are covered by the invention.

All the features disclosed are essential to the invention per se. The content of the disclosure of the associated priority documents (copy of the previous application) and the cited documents and the prior art devices described are hereby incorporated into the disclosure of the application in their entirety, also for the purpose of incorporating individual features or a plurality of features of these documents into one or more claims of the present application.

BRIEF DESCRIPTION OF THE DRAWING

In the Drawings:

FIG. 3 is a plan view of the armrest, FIG. 4 is a side view of the armrest, in which a supporting part of the arm support is shown so as to be transparent, FIG. 5a is a sectional view along sectional line A-A in FIG. 4, FIG. 5b is a view of a detail along detail line E in FIG. 5a, FIG. 6 is a sectional view along sectional line B-B in FIG. 5a, FIG. 7 is a sectional view along sectional line C-C in FIG. 5a, FIG. 8a is a sectional view based on FIG. 5a, in which the latch assembly is in the released position, FIG. 11 is a sectional view based on FIG. 6 in the lower end position, FIG. 12 is a sectional view based on FIG. 7 in the lower end position that is also the lowermost use position in the present case, FIG. 13 is a sectional view based on FIG. 11 in an uppermost use position, FIG. 14 is a sectional view based on FIG. 12 in the uppermost use position.

SPECIFIC DESCRIPTION OF THE INVENTION

Figure 1:
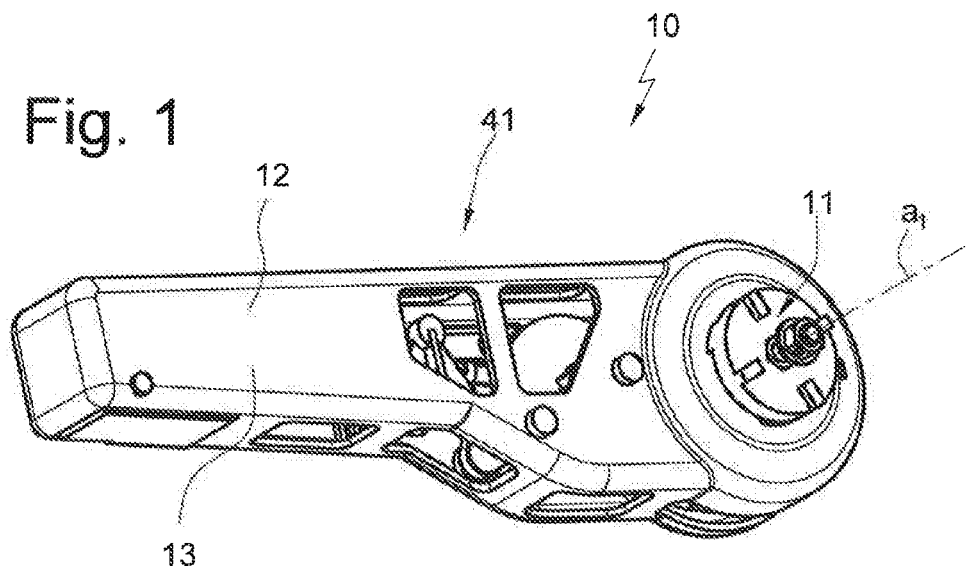
FIG. 1 is an oblique perspective front view of an accessory in the form of an armrest, in which a covering of the armrest is not shown and an arm support of the armrest is shown in an approximately horizontal position.

In the present embodiment, the accessory is an armrest of a vehicle seat that is denoted by reference sign 10 as a whole in the drawings. The armrest 10 comprises a base 11 that is arranged so as to be secured to the vehicle body, and an arm support 12 that is the pivot part within the meaning of the invention.

Figure 2:
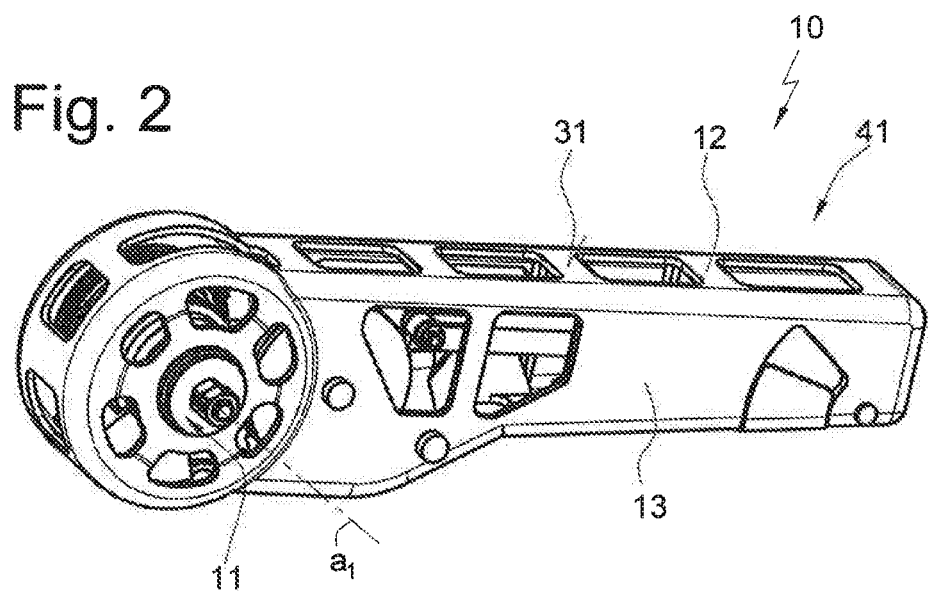
FIG. 2 is an oblique perspective rear view of the armrest according to FIG. 1.
Figure 15:
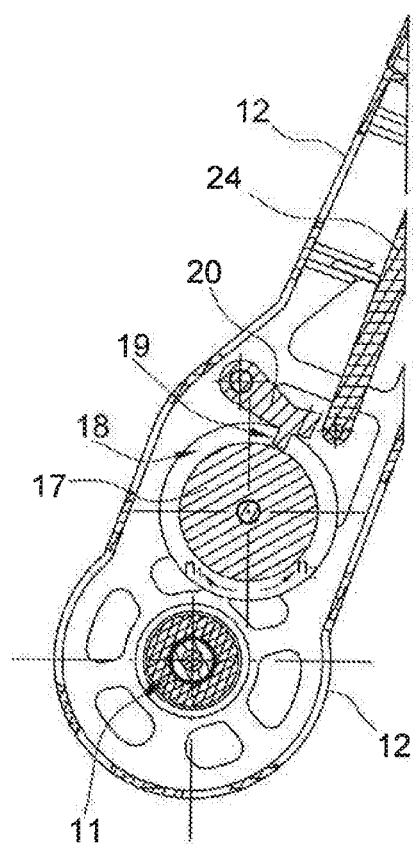
FIG. 15 is a sectional view based on FIG. 13 in the upper end position.

In FIGS. 1 to 3, the armrest 10 is shown without a covering, i.e. without padding, a cover or a plastics outer skin or the like. The arm support 12 can be pivoted about a pivot axis $a_1$ relative to the base 11 in the directions $u_1$ and $u_2$ between a first, lower end position as shown in FIG. 11 and a second end position pivoted upwards to its maximum extent as shown in FIG. 15. A central position arranged between the first and the second end position is shown in FIGS. 1 to 9. The end positions are defined by contact with a stop 43 on the base 11 and a stop 44 on the arm support 12, the stops only being visible in FIG. 10. The arm support 12 comprises a housing-like supporting part 13 that forms an arm-support surface 41.

FIG. 4 shows the supporting part 13 so as to be transparent, such that components of a latch assembly 14 of the armrest 10 are visible. The latch assembly 14 comprises first latch 18 that are on a wheel 17, and second latch 19, which are on the arm support 12 in the present embodiment that could, however, also be retained on the base 11 according to an alternative configuration. The wheel 17 is mounted so as to be rotatable about the rotational axis $a_2$ relative to the arm support 12 in the directions $n_1$ and $n_2$.

The latch assembly 14 comprises first coupling formation in the form of a circular gear segment 15 which is retained on the base 11, and second coupling formation in the form of a gear wheel 16. A transmission ratio is formed between the first and the second coupling formation, which facilitates a light braking force. In the present embodiment, the circular gear segment 15 is movable, but, according to an alternative configuration, it could also be arranged so as to be immovable relative to the base 11. The function associated with the movability of the circular gear segment 15 is discussed further below.

The circular gear segment 15 is constantly in engagement with the second coupling formation in the form of a gear wheel 16. The gear wheel 16 is connected for conjoint rotation to the wheel 17 that is mounted on the arm support 12 so as to be rotatable about the rotational axis $a_2$. The wheel 17 comprises the first latch 18 that interacts with the second latch 19 of a latch element 20 in the form of a lever that is mounted on the arm support 12 so as to be pivotable about a pivot axis $a_3$ by an end region 21. The force with which the second latch are pressed against the first latch can be influenced over the length of the lever arm of the latch element 20. An end region 22 of the latch element 20 opposite the end region 21 forms a pivot joint 23 comprising a movement transducer 24 in the form of a rod. The movement transducer 24 is connected to a pivot joint 25 comprising an actuator 26 in the form of a pivotable lever that in turn forms a pivot joint 27 having a pivot axis $a_4$ together with the arm support 12. The actuator 26 is part of an actuating device 42.

A return device 28, which is in the form of a spring in this case, loads the movement transducer 24 such that the second latch 19 of the latch element 20 are loaded in engagement with the first latch 18 (see FIGS. 4, 5a, 5b and 6). When the first latch 18 are in engagement with the second latch 19 in the latched position, the wheel 17 cannot rotate relative to the arm support 12. This means that a set of teeth 30 of the gear wheel 16 cannot roll on a set of teeth 29 of the circular gear segment 15. The arm support 12 therefore cannot be moved in the direction $u_2$.

FIGS. 4 to 7 show the arm support in a position in which an arm-support surface 31 is arranged approximately horizontally and the latch assembly 14 is in the latched position.

In order to adjust the inclination of the arm support 12, the actuator 26 is pivoted about the pivot axis $a_4$ in the direction $v_1$, the movement transducer 24 being moved in the direction $p_1$ and the latch element 20 pivoting in the direction $w_1$ in the process. The latch 18 and 19 come out of engagement (see FIGS. 8a, 8b and 9) and the latch assembly 14 is in the released position. When the pressure on the actuator is relieved, the return device 28 moves the movement transducer in the direction $p_2$ and thereby moves the latch element 20 in the direction $w_2$ and the actuator 26 in the direction $v_2$.

In the released position, the wheel 17 can rotate relative to the arm support 12, such that the teeth 30 can roll on the teeth 29 and the arm support 12 can be adjusted in its inclination in the direction $u_1$ or $u_2$ into different use positions.

In the present embodiment, the first latch 18 are formed by surfaces 32 that are concave and V-shaped towards one another or are conically tapering and circumferential on an end face 33 of the wheel 17. The second latch 19 are formed by surfaces 34 of a projection 35 of the lever 20 that are complementary to the surfaces 32 and are convex and V-shaped towards one another or are conically tapering towards one another, the surfaces 32 and 34 being inclined such that a wedge effect arises which, in the latched position, i.e. when the surfaces 32 and 34 are in engagement, allows for continuous latching, which prevents the wheel 17 from moving, at least in one rotational direction. In the present embodiment, the latch 18 and 19 reliably prevent the wheel 17 from rotating in the latched position, whether the materials of the surfaces 32 and 34 are identical or different. It is self-evident that the convex surface 34 and the concave surface 32 can each either be on the latch element 20 or to the wheel 17, i.e. that it is also possible to relative positions of the surfaces shown here.

Alternatively, the latch 18 and 19 for locking the arm support 12 could e.g. also comprise friction surfaces on the lever 20 and the wheel 17 or could e.g. comprise interlocking formations, such as teeth, on the lever 20 and the wheel 17. These may be designed to be stepped or finely toothed, ratcheting or locking on both sides.

Figure 8A:
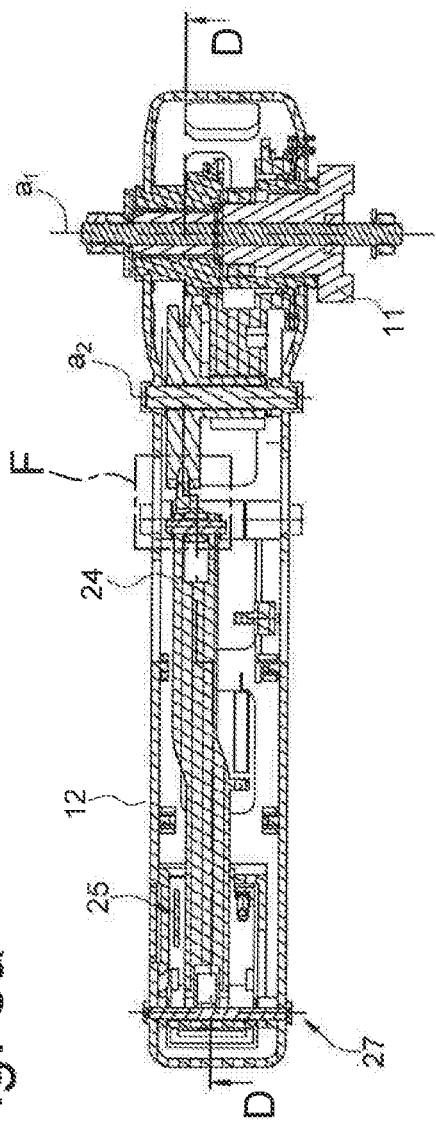
FIG. 8b is a view of a detail along detail line F in FIG. 8a, FIG. 9 is a sectional view along sectional line D-D in FIG. 8a, FIG. 10 is a sectional view in which interacting stops on the base and the arm support can be seen, which define the first end position and the second end position of the arm support.
Figure 8B:
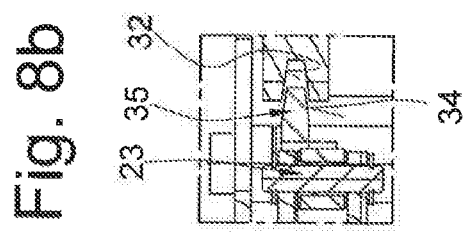
Figure 9:
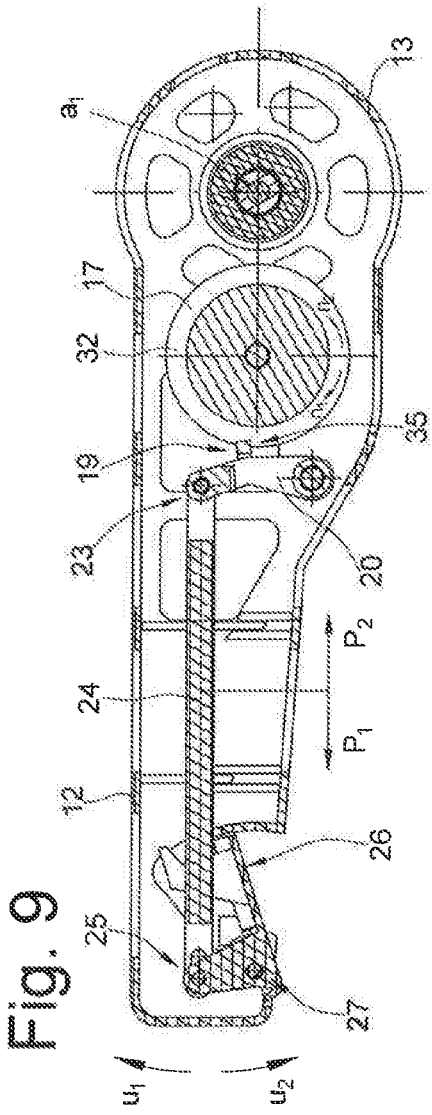
Figure 10:
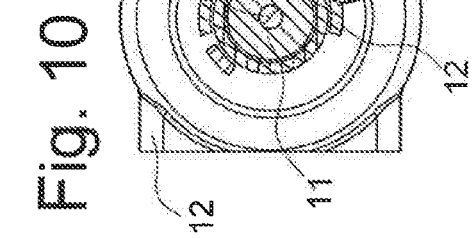
Figure 16:
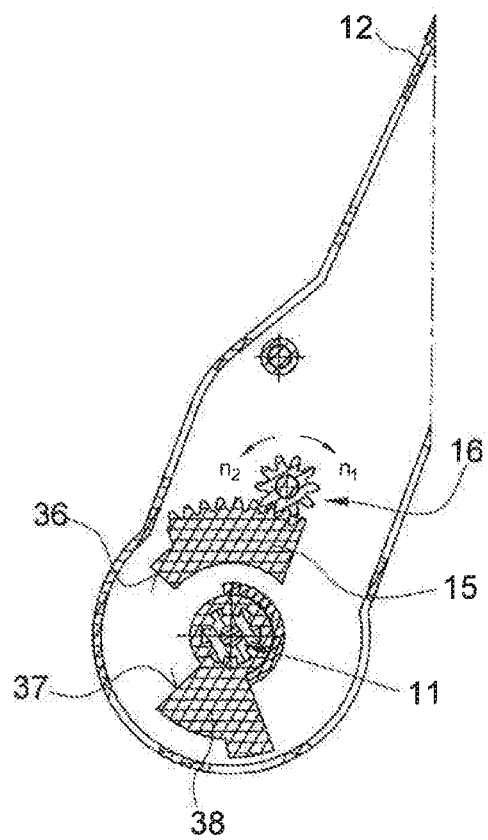
FIG. 16 is a sectional view based on FIG. 14 in the upper end position.

According to FIGS. 11 and 12, the arm support 12 has been adjusted downwards in the direction $u_2$ into the first end position, compared with FIGS. 8a and 9 that show an approximately horizontal arrangement of the arm-support surface 31. This end position corresponds to the lower use position. The gear wheel 16 is positioned on an end region 39 of the set of teeth 29 in this position of the arm support 12. The arm-support surface 31 is inclined downwards. FIGS. 13 and 14 show a use position in which the inclination of the arm support 12 has been adjusted upwards to its maximum extent in the direction $u_1$. The position of the arm support 12 shown in FIGS. 13 and 14 is the uppermost use position. The gear wheel 16 is positioned on an end region 40 of the set of teeth 29 in this position of the arm support 12. FIGS. 15 and 16 show a non-use position. The circular gear segment 15 is designed to be rotatable about the pivot axis $a_1$ in the directions $u_1$ and $u_2$. It is loaded in the direction ul by biasing means (not shown). For this reason, a stop surface 36 of the circular gear segment 15 abuts a counter surface 37 of a wall 38 that is immovable relative to the base 11 (see FIGS. 7, 11 and 13). The stop surface 36 of the circular gear segment 15 therefore does not move out of contact with the counter surface 37 if the teeth 30 of the gear wheel 16 are moving on the teeth 29 of the circular gear segment 15 in the released position in the event that the arm support is moved between the lower use position and the upper use position.

If, in the latched position of the latch assembly 14, in any use position of the arm support 12, i.e. in the first use position, the second use position or between the two above-mentioned positions, the arm support 12 is loaded in the direction $u_1$ counter to the return force of the biasing means, e.g. a spring, the arm support 12 can be moved in the direction $u_1$ until, according to FIG. 16, the stop 44 (only shown in FIG. 10) that is connected for conjoint rotation to the arm support 12 strikes a stop surface on a boundary surface of the stop 43 on the base 11, as a result of which the second end position is defined. In the process, the unit made up of the circular gear segment 15, wheel 17 and latch element 20 moves, as a whole, without any movement of these components relative to one another, counter to the force of the second biasing means into the1kcond end position. As mentioned above, the first end position likewise results due to contact between the stops 43 and 44.

In a return movement, the arm support 12 is moved in the direction $u_2$ until the stop surface 36 strikes the counter surface 37. In this case, the inclination of the arm support 12 is the same as before the upward pivoting in the direction $u_2$, because the relative position between the set of teeth 30 of the gear wheel 16 and the set of teeth 29 of the circular gear segment 15 has not changed. This relative position can only be changed by moving the latch assembly 14 into the released position.

If, according to an alternative configuration, the circular gear segment 15 were designed to be fixed, i.e. immovable relative to the base 11, the arm support 12 in the latched position could not be moved in the direction $u_1$. In any case, it would be necessary to move the latch assembly 14 into the released position in order to move the arm support 12. This will be discussed further below.

According to an alternative embodiment (not shown), however, the circular gear segment 15 could also be arranged so as to be fixed relative to the base 11. In this configuration, the latch assembly 14 would have to be moved into the released position for moving the arm support 14 between the first and the second end position.

Figure 17:
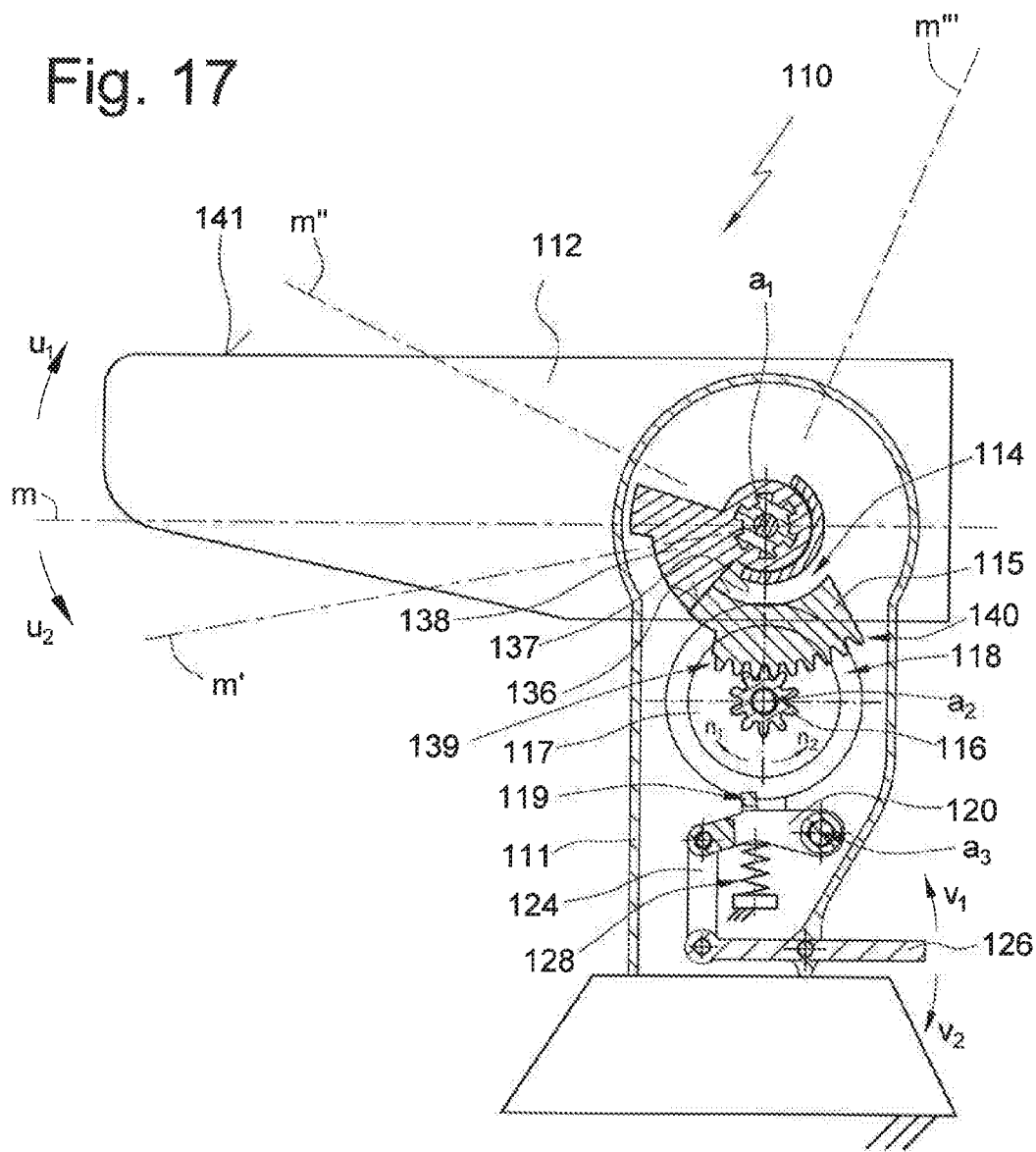
FIG. 17 shows a second embodiment of the armrest that differs from the first embodiment substantially on account of reversing the assignment of the components between the arm support and the base.

A second embodiment is shown in FIG. 17. The reference signs known from the first embodiment have been increased by 100 here. With regard to the first embodiment according to FIGS. 1 to 15, the second embodiment is a reversal of the components on the arm support 12 and the base 11.

FIG. 17 shows an armrest 110 comprising an arm support 112 having an arm-support surface 141. The armrest 110 comprises a latch assembly 114 comprising a circular segment 115 and a wall 138. A wheel 117 is fastened to the base 111 so as to be rotatable about a pivot axis $a_2$. A latch element 120 is loaded by a return device 128 such that latch 119 of the latch element 120 are pushed into engagement with latch 118 of the wheel 117. The lacking means 118 and 119 interact in an identical manner to that in the first embodiment. Pivoting an actuator 126 in the direction $v_1$ can move the latch 119 out of engagement with the latch 118 by the movement transducer 124. When the pressure on the actuator 126 is relieved, the latch element 120 is pivoted by the spring 128 again such that the latch 119 move into engagement with the latch 118.

The wall 138 is fastened to the arm support 112 so as to be fixed, i.e. not movable relative to the arm support 112. Biasing means (not shown) retain the circular gear segment 115 by a stop surface 136 on a counter surface 137 of the wall 138. According to FIG. 16, the latch assembly 114 is in a released position, i.e. the circular gear segment 115 can be moved relative to the gear wheel 116 such that the gear wheel 116 is arranged on the end region 139 or the end region 140 of the circular gear segment 115.

The arm support 112 can be moved, in the same way as in the first embodiment, from the approximately horizontal position shown in FIG. 16 having the center line m into a lowermost use position, which is indicated in FIG. 16 by the central axis m', into an uppermost use position having the central axis m", or into an upper end position m'''.

If the latch assembly 114 is in the latched position, the circular gear segment 115 is fixed relative to the gear wheel 116. When there is torque on the arm support 112 in the direction $u_1$, the arm support 112 can be moved in the direction $u_1$ by overcoming the spring force of the biasing means (not shown), the contact between the stop surface 136 and the counter surface 137 being released. The arm support 112 can then be moved in the direction $u_1$ into the upper end position.

FIGS. 18 to 21 show a third embodiment that differs from the first embodiment merely in that a latch assembly 14' is not controlled by the actuator 26, but instead is controlled by a controller 53 on the basis of the position of the arm support 12'. The reference signs known from the first embodiment have been provided with an apostrophe.

Figure 18:
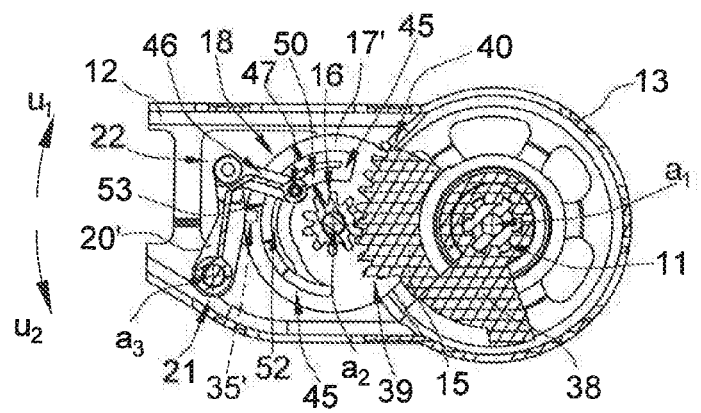
FIG. 18 is a sectional view of a third embodiment of the armrest that differs from the first embodiment merely on account of the actuator of the latch assembly, with the arm support being in a horizontal position.

According to FIG. 18, the arm support 12' is in an approximately horizontal use position. In this embodiment, the latch element 20' comprises a control-link region 46 at its end region 22. The control link also comprises a guide pin 47 that is in engagement with a control cam 45. The guide pin 47 and the control-link region 46 allow the control cam to control the latch element 20' between the latched position and the released position.

The friction ratio or the clamping ratio between the latch 18 of the wheel 17' and the latch 19 of the projection 35 is configured such that the arm support 12' can be moved in the direction $u_1$ in the latched position, with the wheel 17' moving with slip relative to the projection 35 of the latch element 20'. No slip is possible between the projection 35 and the wheel 17' in the direction $u_2$, and therefore the arm support 12' is securely locked in the latched position in the direction $u_2$.

The spring force of the biasing means that keep the circular gear segment 15 in contact with the wall 38, is so great that the contact is maintained in the latched position when the arm support 12' moves out of the position according to FIG. 18 in the direction $u_1$.

Figure 19:
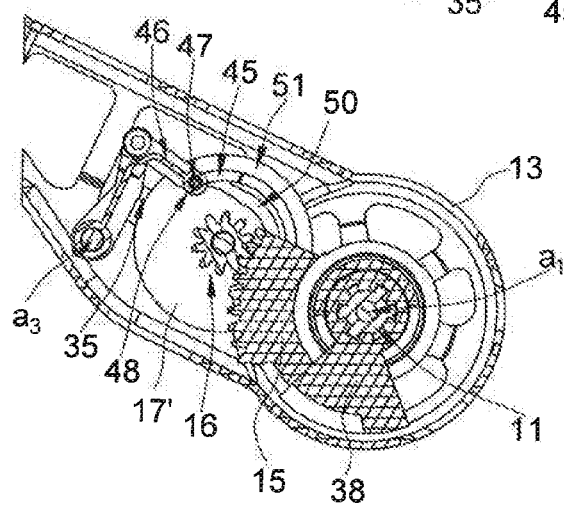
FIG. 19 shows the armrest based on FIG. 18, with the arm support being in the upper use position.
Figure 20:
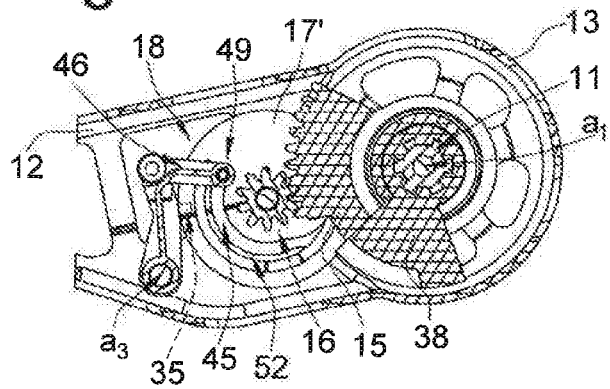
FIG. 20 shows the armrest according to FIG. 18, with the arm support being in the lower use position that is also the lower end position.
Figure 21:
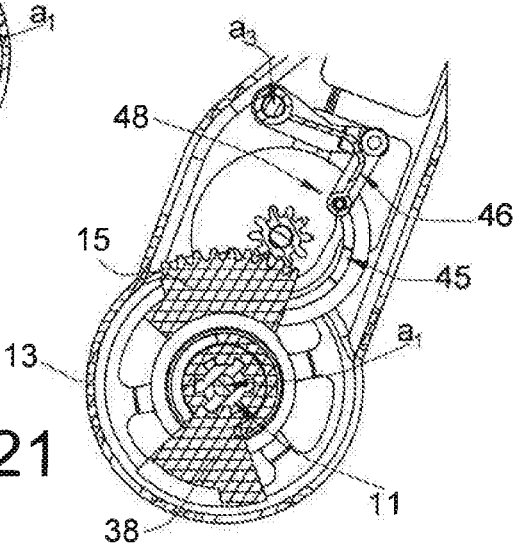
FIG. 21 shows the armrest based on FIG. 18, with the arm support being arranged in the upper end position.

When the arm support 12' moves between the position according to FIG. 18 and the position according to FIG. 19, the set of teeth 30 of the gear wheel 16 rolls on the set of teeth 29 of the circular gear segment 15 until, according to FIG. 20, the gear wheel 16 is positioned on the first end region of the circular gear segment 15. During the movement, the wheel 17', which is rigidly connected to the gear wheel 16, also rotates relative to the guide pin 47 to the extent that the guide pin 47 moves on a control path 50 until it reaches an end region 48 of the control cam 45.

At the end region 48, the guide pin 47 moves from the control path 50 onto a control path 51 that is separated from the control path 50 in portions by means of wall 52 of the control cam 45, in order to prevent the guide pin 47 from switching between the control paths 50 and 51. During this movement, the latch element 20' is moved out of engagement with the wheel 17' into the released position by the control link 46.

If the arm support 12' is moved out of the position according to FIG. 18 further in the direction $u_1$ into the position according to FIG. 19, such that the gear wheel 16 is positioned on the end region 40 of the set of teeth 29, interacting stops (not shown) on the arm support 12' and the circular gear segment 15 prevent the gear wheel 16 from moving any further in the direction ul relative to the set of teeth 15, such that the circular gear segment 15 pivots about the pivot axis $a_1$ in the direction ul counter to the force of the biasing means (not shown) and loses contact with the wall 38. The arm support 12' can be pivoted in the direction ul until the stop 44 on the arm support 12' and the stop 43 on the base 11 prevent any further movement in the direction ul in the upper end position according to FIG. 21.

A return movement of the arm support 12' can then readily take place in the direction $u_2$ until the circular gear segment 15 comes back into contact with the wall 38. The arm support 12' is then in the position according to FIG. 19 again. Since nothing has changed in terms of the position of the wheel 17' and the released position of the latch element 20' during the movement of the arm support 12' into the end position according to FIG. 21 and back into the position according to FIG. 19, the arm support 12' can be moved further in the direction $u_2$, with the gear wheel 16 rolling on the circular gear segment 15 and the wheel 17' accordingly rotating therewith in the process.

When the lower end position of the arm support 12' according to FIG. 20 is reached, the gear wheel 16 is positioned on an end region 39 of the set of teeth 29. In the lower end position, the stops 43 and 44 prevent any further movement of the arm support 12' in the direction $u_2$. In the process, the wheel 17' has rotated relative to the guide pin 47 to the extent that it is positioned on an end region 49 of the control cam 45, and this means that the guide pin 47 moves from the control path 51 onto the control path 50. During this movement of this guide pin 47, the latch element 20' is moved into the latched position by the control link 46. A movement of the arm support 12' in the latched position is once again possible in the direction $u_1$, the wheel 17' moving with slip relative to the projection 35, but a movement of the arm support 12' in the direction $u_2$ is prevented.

It is also noted that the arm support 12' can of course also be pivoted directly in the direction $u_2$ out of the position according to FIG. 19, in which the latch assembly 14' has moved into the released position.

Additionally or alternatively to the manual actuation, the controller known from the third embodiment can also be used in the embodiment of the armrest according to the second embodiment.

The invention claimed is:

1. An accessory for a vehicle, the accessory comprising:
   a base;
   a pivot part that can be pivoted relative to the base in a first pivoting direction and an opposite second pivoting direction between a first end position and a second end position;
   a latch assembly that has a first latch and a second latch for locking the pivoting movement of the pivot part in at least one of the directions;
   an actuating device for automatically and/or manually moving the latch assembly between a latched position in which the first latch and the second latch are in engagement with each other and a released position in which the latches are out of engagement with each other, one of the latches having a wheel that is rotatable and has first blocking surfaces, the base or the pivot part having a first set of teeth in engagement with a second set of teeth of the wheel on the other of the base or the pivot part and forming a moving connection causing the wheel to rotate on pivoting of the pivot part, the other of the latches having a latch element movable between the latched position and the released position and provided with second blocking surfaces that are in engagement with the first blocking surfaces in the latched position and out of engagement with this first blocking surfaces in the released position.

2. The accessory according to claim 1, wherein one of the first or second blocking surfaces has a V-shaped concave surface structure and the other of the first and second blocking surfaces has a V-shaped convex surface structure, apex angles of the V-shaped surface structures being such that a wedge effect arises when the first blocking surfaces and the second blocking surfaces are in engagement with each other.

3. The accessory according to claim 2, wherein the first blocking surfaces and the second blocking surfaces are formed by interacting friction surfaces.

4. The accessory according to claim 1, wherein one of the sets of teeth is formed as a gear wheel or a gear segment.

5. The accessory according to claim 1, wherein one of the sets of teeth is movable and comprises a stop surface urged against a counter surface of the base by a return device.

6. The accessory according to claim 1, wherein a stop surface of the pivot part is in contact with a boundary surface of the base in the first end position and/or in the second end position.

7. The accessory according to claim 1, wherein the actuating device comprises an actuator that can be actuated on the outside of the accessory by a user and that can move the latch assembly between the latched position and the released position.

8. The accessory according to claim 1, wherein the actuating device comprises a controller having first control means on the base and second control means on the pivot part, the controller allowing the pivot part to move freely in the first pivoting direction and while preventing such movement in the second pivoting direction, the pivot part when moved in the first pivoting direction beyond a first reversal point being pivotal in the second pivoting direction until the pivot part passes a second reversal point.

9. The accessory according to claim 1, wherein the sets of teeth are formed such that rotation of the wheel takes place proportionally to the pivoting movement of the pivot part.

10. The accessory according to claim 1, wherein the accessory is an armrest and the pivot part is a pivotable arm support.

\* \* \* \* \*